June 1, 1926.
G. PITTER
1,587,179
COMBINATION LUGGAGE CARRIER AND CAMP TABLE
Filed April 16, 1923
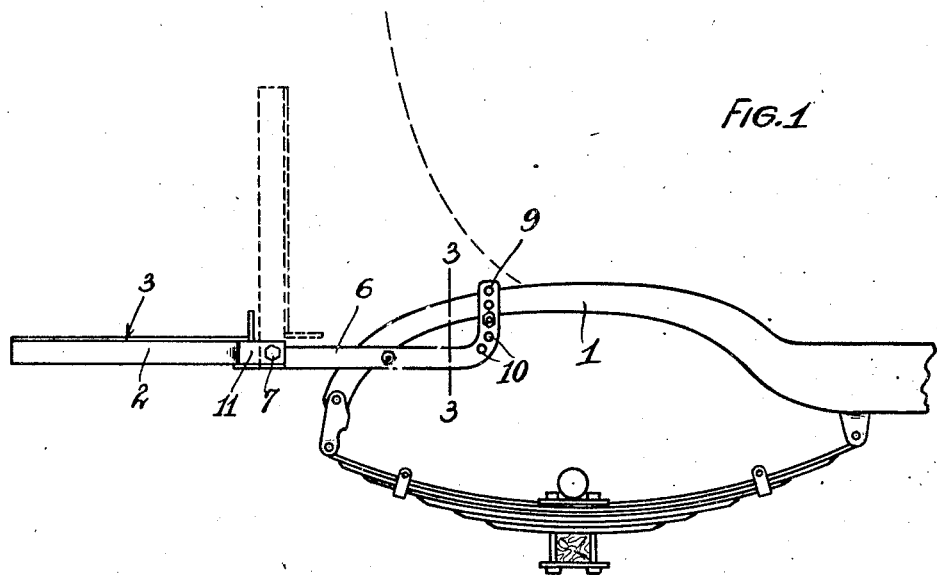
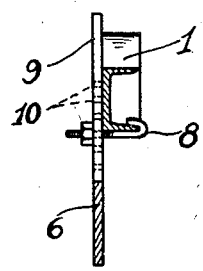
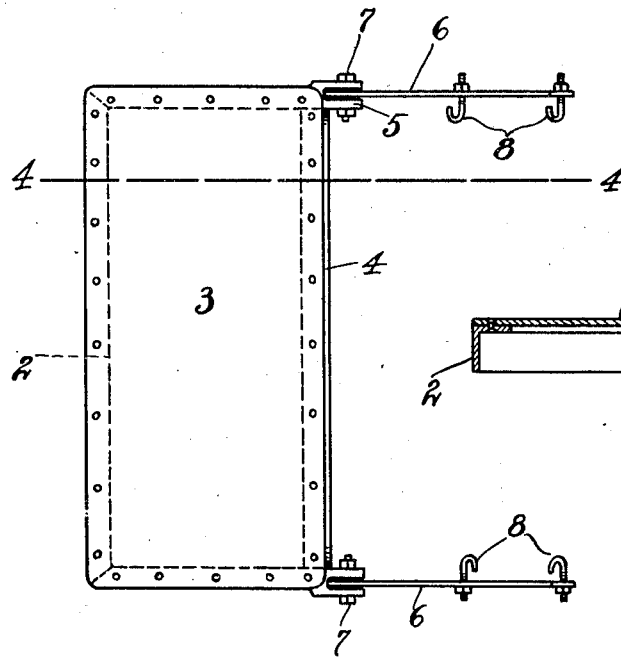
INVENTOR
GEORGE PITTER
BY
Harry C. Schroeder
ATTORNEY Patented June 1, 1926.

1,587,179

UNITED STATES PATENT OFFICE.

GEORGE PITTER, OF OAKLAND, CALIFORNIA, ASSIGNOR TO ELEANORA MAUD PITTER, OF OAKLAND, CALIFORNIA.

COMBINATION LUGGAGE CARRIER AND CAMP TABLE.

Application filed April 16, 1923. Serial No. 632,208.

My invention is an improved luggage carrier and table. The object of my invention is to provide a luggage carrier which may be attached to the rear end of an automobile, and which may also be used for a table when desired.

Another object of my invention is to provide a combined luggage carrier and table which is simple in construction and inexpensive to manufacture.

In the drawing in which my invention is illustrated—

Fig. 1 is a side view of my carrier attached to an automobile chassis.

Fig. 2 is a plan view of my carrier.

Fig. 3 is a sectional view taken on the line 3—3 of Fig. 1.

Fig. 4 is a sectional view taken on the line 4—4 of Fig. 2.

Referring more particularly to the drawing: the numeral 1 indicates an automobile chassis to which my carrier is adapted to be attached.

My luggage carrier comprises a U shaped frame 2, upon the top of which a plate 3 is secured, to form a table or carrier as desired. An angle bar 4 extends across the back of the plate 3, and is secured to the frame 2 and to said plate. Notches 5 are formed in the ends of the side arms of the frame 2, in which a pair of supporting arms 6 are pivoted by bolts 7, which extend through said frame and said arms. The arms 6 are each secured to the chassis 1 by means of a pair of hook headed bolts 8. All chassis are not bent downwardly at the same angle, the curve varying according to the make and model of the automobile. To compensate for this variation, so that the arms 6 may be horizontal at all times, I bend the rear end of said arms upwardly as at 9 and provide a plurality of holes 10 therein, so that the bolt 8 may be moved upwardly or downwardly as desired. The rear end of the arm 6 projects beyond the pivot 7 as at 11, which allows the frame 2 to rest upon it when said frame is in the horizontal position.

Having described my invention I claim:

1. A luggage carrier and table comprising a frame, a plate on said frame, the end of said frame having notches cut therein, supporting arms pivoted to said frame in said notches, up-turned ends on said arms said ends having a plurality of holes therein, and a bolt adapted to extend through said holes and fasten to the automobile.

2. A luggage carrier and table comprising a rectangular frame having notches at its ends, a bar secured to said frame, a plate secured to said frame, supporting arms pivoted to the frame in said notches, the ends of said arms being turned up and having a plurality of holes formed therein and bolts adapted to extend through said holes to fasten said arms to an automobile.

In testimony whereof I affix my signature.

GEORGE PITTER.